United States Patent
Huscroft et al.

(10) Patent No.: US 6,188,692 B1
(45) Date of Patent: Feb. 13, 2001

(54) INTEGRATED USER NETWORK INTERFACE DEVICE FOR INTERFACING BETWEEN A SONET NETWORK AND AN ATM NETWORK

(75) Inventors: Charles K. Huscroft, Port Moody; John R. Bradshaw, Burnaby; Vernon R. Little, Belcarra; Brian D. Gerson, Coquitlam; Graham B. Smith, Burnaby, all of (CA)

(73) Assignee: PMC-Sierra Ltd., Burnaby (CA)

( * ) Notice: Under 35 U.S.C. 154(b), the term of this patent shall be extended for 0 days.

(21) Appl. No.: 09/022,489

(22) Filed: Feb. 12, 1998

Related U.S. Application Data

(63) Continuation-in-part of application No. 08/437,389, filed on May 11, 1995.

(51) Int. Cl.[7] .............................. H04J 3/07; G06F 13/00
(52) U.S. Cl. ......................... 370/395; 370/505; 370/506; 370/476; 370/399; 331/11; 331/57; 710/106
(58) Field of Search ................. 331/11, 1 A, 57; 370/395, 505, 506, 516, 399, 476; 359/158, 118; 710/106

(56) References Cited

U.S. PATENT DOCUMENTS

| | | | |
|---|---|---|---|
| 4,928,275 | * 5/1990 | Moore et al. | 370/506 |
| 5,144,619 | * 9/1992 | Munter | 370/353 |
| 5,170,272 | 12/1992 | Onno | 359/154 |
| 5,239,544 | 8/1993 | Balzano et al. | 370/465 |
| 5,274,635 | 12/1993 | Rahman et al. | 370/395 |
| 5,309,438 | 5/1994 | Nakajima | 370/500 |
| 5,319,680 | * 6/1994 | Port et al. | 375/375 |
| 5,359,600 | * 10/1994 | Ueda et al. | 370/399 |
| 5,384,774 | 1/1995 | Martin et al. | 370/505 |
| 5,390,180 | * 2/1995 | Reilly | 370/476 |
| 5,422,882 | 6/1995 | Hiller et al. | 370/399 |
| 5,483,527 | * 1/1996 | Doshi et al. | 370/399 |
| 5,512,860 | * 4/1996 | Huscroft et al. | 331/1 A |
| 5,568,482 | 10/1996 | Li et al. | 370/395 |
| 5,568,486 | * 10/1996 | Huscroft et al. | 370/395 |
| 5,859,570 | * 1/1999 | Itoh et al. | 331/18 |

OTHER PUBLICATIONS

Johnston et al. "The ATM Layer Chip: An ASIC for B–ISDN Applications", IEEE Jun. 1991.
Phung et al. "Study of a SONET STS–3c based ATM User Network Interface Design", TEEE 1993.
Robe et al. "A Sonet STS–3c User Network Interface Integrated Circuit", IEEE Jun. 1991.
ITU–T Recommendation I.432 "B–ISDN User–Network Interface–Physical Layer Specification", Mar. 1993.
American National Standards Institute, Inc. "Synchronous Optical Network (SONET)—Basic Description including Multiplex Structure, Rates and Formats" Ti.105–1995.

* cited by examiner

*Primary Examiner*—Thomas C. Lee
*Assistant Examiner*—Tammara Peyton
(74) *Attorney, Agent, or Firm*—Hall, Priddy, Myers & Vande Sande

(57) ABSTRACT

A user network interface device for interfacing between synchronous optical network (SONET)/synchronous digital hierarchy (SDH) which is characterized by a continuous stream of frames of data and an asynchronous transfer mode (ATM) characterized by a non-continuous stream of cells of data. The user network interface device includes an integral phase lock loop circuit to recover clock and data from an encoded incoming stream of data. In another embodiment, the network interface device synthesizes a high speed transmit clock from a low frequency reference source.

38 Claims, 14 Drawing Sheets

INTEGRATED USER NETWORK INTERFACE DEVICE FOR INTERFACING BETWEEN A SONET NETWORK AND AN ATM NETWORK

This application is a continuation-in-part of application Ser. No. 08/437,389, filed May 11, 1995.

FIELD

The present invention relates to a monolithic integrated circuit that interface between synchronous optical network (SONET)/synchronous digital hierarchy (SDH) STS-3c, which is a digital transmission standard that defines a new digital hierarchy for fiber optic transmission and a frame structure for multiplexing digital traffic, and asynchronous transfer mode (ATM). ATM is a new payload multiplexing technique which segments payload into 53-byte cells which can be allocated to user channels based on demand.

BACKGROUND

The advent of applications such as network computing, multimedia, video conferencing, and real-time imaging require data rates ranging into the gigabits-per-second. The demand for such high rates has led the industry to combine a standardized wide band network (SONET) with the simplicity of an efficient network that uses fixed-length 53-byte-wide asynchronous transfer-mode (ATM) cells. In 1992 ATM was chosen by the CCITT (Consultative Committee for International Telephony and Telegraphy and now the ITU) as the transport technology for the huge variety of services to be offered by the Broad band Integrated Services Digital Network (B-ISDN). However, it has been recognized that ATM is equally well-suited for use in the local area network. An ATM cell consists of 53 octets or bytes with a 5 byte cell header containing control bits and a 48 octet or byte cell payload which contains the data bits. In order to interface with a standardized wide band network, such as Synchronous Optical Network (SONET), appropriate interfaces to transfer from one system to the other have been and are being developed.

In order to integrate all of the functions of an ATM physical layer interface into a single device, and at the same time be applicable to local and wide area networking applications, a number of criterion have to be met. First, one requires a fully compliant SONET/SDH STS-3c framer. Here the term SDH refers to ITU's synchronous digital hierarchy and STS-3c refers to a data transmission rate of 155.52 megabits-per-second (Mbits/s). The SONET STS-3c frame structure consists of 9 rows of bytes with each row having 9 bytes of transport overhead and 261 columns of 9 bytes each with one of the columns having control bits defining path overhead while the remaining columns are payload. The framer takes ATM cells and puts them into a synchronous series of SONET frames.

A second requirement of an interface device is an ATM cell processor to perform cell delineation and null cell insertion/filtering. Since many of the services elivered by ATM are by definition asynchronous, they are characterized by a non-continuous cell stream. Thus, cell rate de coupling transforms a non-continuous cell stream into a continuous stream by inserting idle or null cells (containing no payload) during idle periods in the assigned cell stream. By making the cell rate continuous, it is necessary only to synchronize with the incoming cells in order to place the ATM cells in their assigned locations in a frame.

A third requirement is a line side interface to support serial input/output at 155 Mbits/s. For SONET/SDH systems, current devices utilize expensive external phase locked loops and crystal oscillators to provide the clock recovery and clock synthesis functions. No one to date has been able to successfully implement integral phased locked loop circuits to recover clock and data from the encoded incoming data stream and to synthesize the high speed transmit clock from a low frequency reference.

Accordingly, it is an object of the invention to provide an integral phase locked loop that recovers the clock and data from the serial encoded receive stream and that synthesizes the high speed 155.52 MHz or 51.84 MHz transmit clock from a low frequency reference.

SUMMARY OF THE INVENTION

According to the invention there is provided a user network interface (UNI) device for interfacing between a synchronous optical network (SONET) and an asynchronous transfer mode (ATM) network. The UNI device has a transmit section and a receive section. The transmit section is operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data. The receive section is operative to receive incoming frames of data in an incoming continuous stream of data, extract ATM cells from the incoming frames of data, and transmit the extracted ATM cells in an outgoing non-continuous stream of data cells. The receive section includes an integral clock recovery circuit operative to sample and recover clock from the incoming continuous stream of data.

The integral clock recovery circuit is preferably operative to lock on to and recover the clock from the incoming continuous stream of data when a frequency difference between a divided down output from the integral clock recovery circuit and a first reference clock signal is less than or equal to a predetermined threshold, and where otherwise the integral clock recovery circuit locks on to the first reference clock signal.

The integral clock recovery circuit is also preferably operative to lock on to and recover the clock from the incoming continuous stream of data only if the incoming continuous stream of data has a number of transitions greater than or equal to a preset value for an n-bit interval. In one embodiment, the preset value is 1 and the n-bit interval is an 80-bit interval.

Preferably, the integral clock recovery circuit includes a first voltage control oscillator (VCO) operative to lock on to the incoming continuous stream of data, a phase/frequency detector operative to compare the phase and frequency of a first reference clock signal and the divided down VCO output signal from a first divider circuit, and a data phase detector operative to compare the phase of the incoming continuous stream of data and the divided down output signal from the first divider circuit. Preferably, the first VCO is switched from the phase/frequency detector to the data phase detector when a frequency difference between a frequency of the divided down output signal from the first VCO and that of the first reference clock signal is less than or equal to a predetermined threshold, and the first VCO is switched back to the phase/frequency detector when the frequency difference exceeds the predetermined threshold.

The integral clock recovery circuit may include a first reference clock input line for receiving a first reference clock signal and a data input line for receiving the incoming continuous stream of data. The clock recovery circuit may also include a first loop filter operative to cut out high frequency components of input signals and to control input of the first VCO, a loop control multiplexer operative to selectively drive the loop filter and control the first VCO from one of the phase/frequency detector and the data phase detector, a transition detector operative to monitor a transition density of the incoming continuous stream of data, a clock difference detector, operative to compare a frequency of the first reference clock signal and the divided down output signal of the first VCO, and a control state machine operative to control the control loop multiplexer.

As contemplated within the scope of this invention, there is also provided a user network interface device comprising a transmit section and receive section wherein the receive section includes an integral clock synthesis circuit operative to synthesize a high speed transmit clock from a low frequency reference source. Preferably, the integral clock synthesis circuit includes a second voltage control oscillator (VCO); a second divider circuit having an input coupled to an output of the second VCO; (cc) a second loop filter having an output coupled to an input of the second VCO; (dd) a charge pump coupled to the second loop filter and operative to send source currents and sink currents into the second loop filter to control the second VCO; (ee) a second reference clock line for receiving a second reference clock signal; and (ff) a dual phase/frequency detector operative to drive the charge pump, having an input coupled to an output of the second divider circuit and the second reference clock line.

The second loop filter may have a transfer function optimized to enable the integral clock synthesis circuit to track the second reference clock signal and attenuate high frequency jitter on the second reference clock signal. The transfer function may yield a low pass corner frequency of about 736 KHz when referenced to a 19.44 MHz crystal. The transfer function may also yield a low pass corner frequency of about 245 KHz when referenced to a 6.48 MHz crystal.

In another embodiment, the transmit section of the UNI device comprises (i) a transmit cell buffer operative to receive and store incoming data cells from the incoming non-continuous stream of data cells; (ii) a transmit section processor operative to generate and insert idle cells into the incoming non-continuous stream of data cells to form a continuous stream of cells and to map the continuous stream of cells into outgoing frames of data, the transmit section processor having an input coupled to an output of the transmit cell buffer; (iii) a parallel-to-serial converter having an input coupled to an output of the transmit section processor; (iv) an encoder, having an input coupled to an output of the parallel-to-serial converter, operative to encode data received from the parallel-to-serial converter; and (v) an integral clock synthesis circuit coupled to the encoder and operative to synthesize a high speed transmit clock from a low frequency reference source; wherein the receive section transmits the outgoing frames of data in an outgoing continuous stream of data directed to the synchronous optical network. In this embodiment, the receive section is operative to receive incoming frames of data in an incoming continuous stream of data from the synchronous optical network and comprises: (i) a serial interface; (ii) a decoder operative to recover data from the incoming continuous stream of data and having an input coupled to the serial interface; (iii) an integral clock recovery circuit operative to sample and recover clock from the incoming continuous stream of data, having an output coupled to an input of the decoder; (iv) a serial-to-parallel converter having an input coupled to an output of the decoder; (v) a receive section processor operative to extract data cells from the incoming frames of data, having an input coupled to an output of the serial-to-parallel converter; and (vi) a receive cell buffer operative to store the extracted data cells for transmission in an outgoing non-continuous stream of data cells, having an input coupled to an output of the receive section processor; wherein the receive section transmits the extracted data cells in an outgoing non-continuous stream of data to the ATM network.

As also envisioned within the scope of this invention, there is provided a method, in a user network interface (UNI) device interfacing between a synchronous optical network (SONET) and an asynchronous transfer mode (ATM) network, for recovering clock from an incoming continuous stream of data received by the UNI device from the synchronous optical network, the UNI device having an integral clock recovery circuit. In one embodiment the method comprises the steps of:

(a) generating a divided down clock signal in the UNI device;

(b) testing if a frequency of a reference clock signal and a frequency of the divided down clock signal differs by no more than a predetermined threshold;

(c) synchronizing the integral clock recovery circuit to a phase and a frequency of the incoming continuous stream of data, if the test in step (b) produces a result of true; and (d) recovering clock from the incoming continuous data stream in the event the phase and frequency are synchronized in step (c).

In another embodiment, the method for recovering clock from an incoming continuous stream of data comprises the steps of:

(a) driving a first voltage control oscillator (VCO) in the integral clock recovery circuit with a phase/frequency detector;

(b) dividing down a signal from the first VCO to produce a divided down clock signal;

(c) testing if a frequency of a reference clock signal and a frequency of the divided down clock signal differs by no more than a predetermined threshold;

(d) switching control of the first VCO from the phase/frequency detector to a data phase detector so as to synchronize to a phase and a frequency of the incoming continuous stream of data, when the test in step (c) produces a result of true;

(e) testing if the incoming continuous stream of data has a number of transitions greater than or equal to a preset value for an n-bit interval; and (f) signaling to the UNI device that the integral clock recovery circuit is locked on to the clock of the incoming continuous stream of data in the event the phase and frequency are synchronized in step (c) and the number of transitions is greater than or equal to the preset value in step (e).

There is also contemplated within the scope of this invention a method, in a UNI device, of synthesizing with a integral clock synthesis phase lock loop circuit a high speed transmit clock from a low frequency reference source. This method may include the steps of:

(a) controlling a second voltage control oscillator (VCO) with a charge pump;

(b) generating a divided down output signal from the second VCO with a second divider circuit;

(c) comparing the divided down output signal to a second reference clock signal; and (d) driving the charge pump with a dual phase/frequency detector so as to synchronize the divided down output signal with the second reference clock signal.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

This application is a continuation-in-part of application Ser. No. 08/437,389, filed May 11, 1995, the whole of which is incorporated herein by reference.

Figure 1:
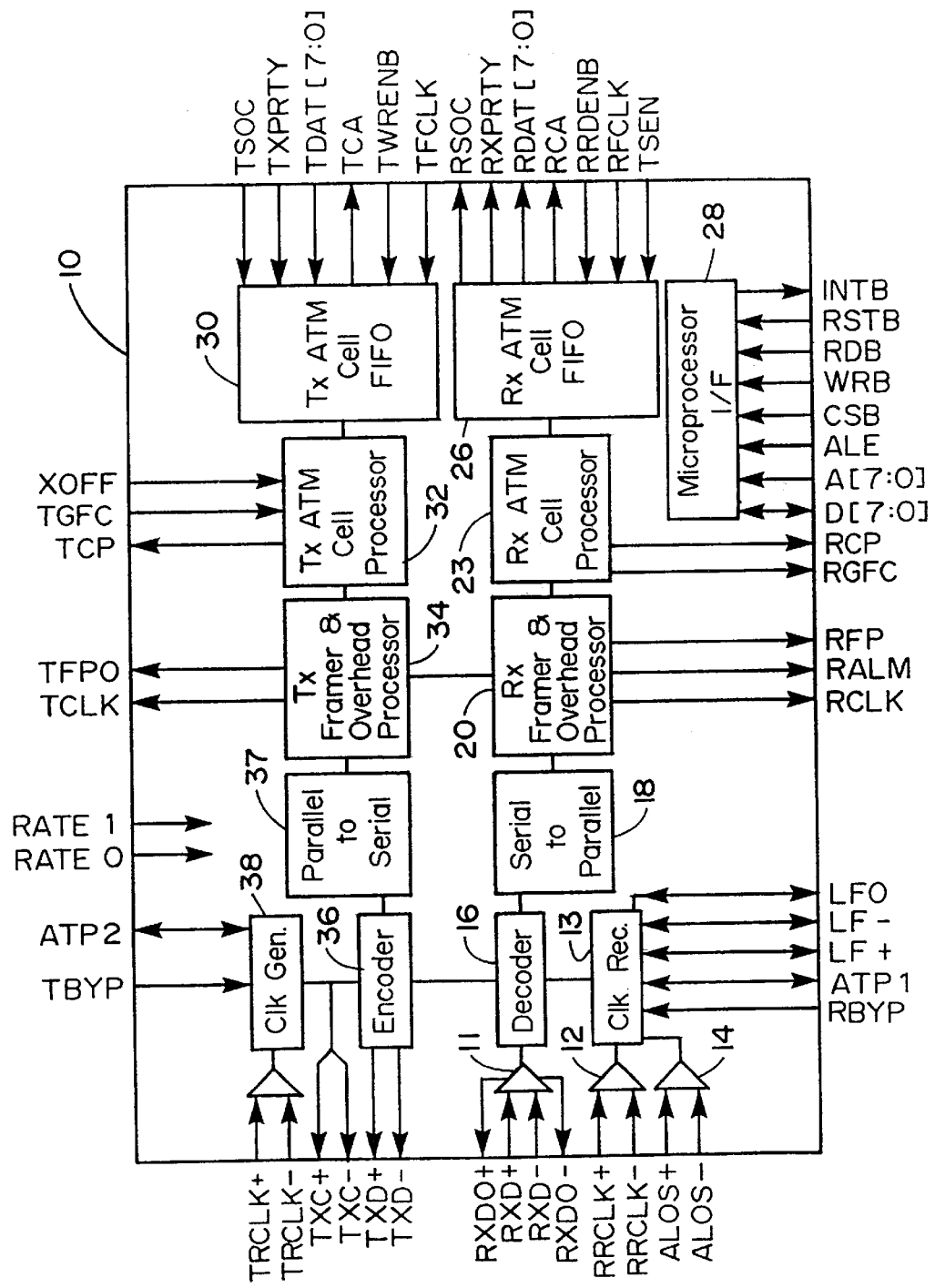
FIG. 1 is a schematic diagram of the SONET/SDH ATM physical layer interface.

Referring to FIG. 1 the user network interface device or physical layer device 10 implements the SONET/SDH processing and ATM mapping functions of a 155 Mbit/s or 51 Mbit/s ATM user network interface. SONET/SDH frames are received on receive differential data inputs RXD$_+$ and RXD$_-$ by the bit serial interface 11. The output from the bit serial interface 11 is directed to decoder 16 which recovers data and couples to the clock recovery circuit 13 which recovers the clock. The output from the decoder 16 is directed to a serial-to-parallel converter 18 which converts the received 155.52 Mbit/s SONET stream to a 19.44 Mbyte/s stream and searches for the SONET/SDH framing pattern in the incoming stream and performs serial to parallel conversion on octet boundaries.

The output of the serial to parallel converter 18 is coupled to the input of a receive framer and overhead processor 20 which provides frame synchronization, de-scrambling, pointer interpretation, extraction of path overhead, extraction of the synchronous payload envelope (SPE), detection of section, line and path level alarm conditions, monitoring section, line and path bit interleaved parity, and accumulating error counts at each level for performance monitoring purposes.

Following overhead processing, the signals from the output of the processor 20 are directed to the input of a receive ATM cell processor 23. The ATM cell processor 23 performs framing to the ATM payload using ATM cell delineation with cell filtering based on idle/unassigned cell detection and header check sequence error detection, and performs ATM cell payload de scrambling. Idle/unassigned cells may be dropped according to a programmable filter. Cells are also dropped upon detection of an uncorrectable header check sequence error. The ATM cell payloads are descrambled. Generic flow control (GFC) bits from error free cells are extracted and presented on a serial link for external processing. The output of the receive ATM cell processor 23 couples to the input of a 4 cell deep receive ATM cell FIFO 26 which passes data structures consisting of 53 8-bit words and is used to separate the STS-3c line timing from the higher layer ATM system timing. Cells are read from the output of the FIFO 26 by a synchronous 8 bit wide data path interface with cell-based handshake.

A transmit cell FIFO 30 provides FIFO management and the asynchronous interface between the physical layer device 10 and the external environment. The transmit FIFO 30 can accommodate four cells. It provides for the separation of the STS-3c line or physical layer timing from the ATM layer timing. The FIFO 30 supports 53 8-bit words, comprising the 5 octet cell header, and the 48 octet payload.

Management functions of the transmit FIFO 30 include filling the transmit FIFO 30, indicating when cells are available to be written to the transmit FIFO 30, maintaining transmit FIFO read and write pointers, and detecting a FIFO overrun condition. Upon detection of an overrun condition, the FIFO 30 is automatically reset. Up to four cells may be lost during the FIFO reset operation. FIFO overruns are indicated through a maskable interrupt and register bits. The synchronous interface provided to an external device (not shown) issues a TSOC signal to indicate to the FIFO 30 that the first word of the selected data structure is present on the TDAT bus. The external circuitry is then notified by issuance of a TCA signal that a cell may be written to the transmit FIFO 30 (cell available). Once the cell is written to the FIFO 30, the FIFO 30 changes from cell available to cell unavailable status on write cell boundaries.

The Transmit Cell Processor 32 coupled to the output of the FIFO 30, provides rate adaptation via idle/unassigned cell insertion and HCS generation and insertion, and performs ATM cell scrambling. An idle or unassigned cell is transmitted if a complete ATM cell has not been written into the FIFO 30.

The transmit framer and overhead processor 34 has an input coupled to the output of the cell processor 32. The transmit overhead processor 34 provides transport frame alignment generation, pointer generation, path overhead insertion, insertion of the synchronous payload envelope, insertion of path level alarm signals and a path bit interleaved parity calculation and insertion for performance monitoring.

Transmit line overhead processing provides line level alarm insertion, and bit interleaved parity insertion using even parity as required to allow performance monitoring on the far end. Line and path far end block error indications are also inserted. Transmit section overhead processing provides frame pattern insertion, scrambling, section level alarm signal insertion and bit interleaved parity insertion.

The output from the transmit framer and overhead processor 34 is directed to a parallel to serial converter 37 which converts the internal 19.44 Mbyte/s stream to a 155.52

Mbit/s stream which it directs to encoder 36. Encoder 36 scrambles the payload of ATM cells although such scrambling can be disabled.

No line rate clocks are required directly by the device 10 as it synthesizes the transmit clock and recovers the receive clock using a 19.44 MHz or 6.48 MHz reference clock.

Figure 2:
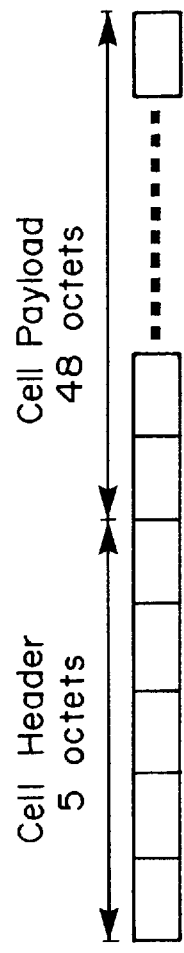
FIG. 2 is a schematic diagram of the ATM cell structure.
Figure 2:
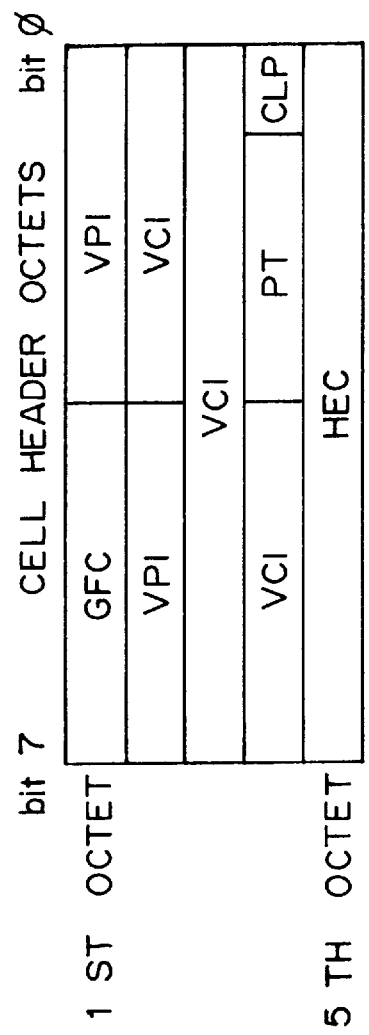

Referring to FIG. 2 there is shown an ATM cell structure which consists of 53 octets or bytes. A cell header 11 has 5 octets and the cell payload has 48 octets. The cell header fields are shown in FIG. 2. The GFC consists of four bits which contain the generic flow control field and are used for traffic flow control of the user network interface (UNI). The VPI/VCI fields consist of 24 bits containing the virtual path/virtual channel identification. These fields are used for routing a cell through a private or public ATM network. The PT field consists of three bits indicating the payload type carried by the cell. The eight values represented by this field are used to indicate the cell user data type, and management information. The CLP field contains one bit which allows the user or the network to set the loss priority of the cell. This bit is set for cells that may be discarded by the network. The field HEC called the header error control octet is used by the physical layer for cell delineation. It is also used for detection and correction of bit errors in the cell header. This octet or byte is also referred to as the header check sequence (HCS).

Figure 3:
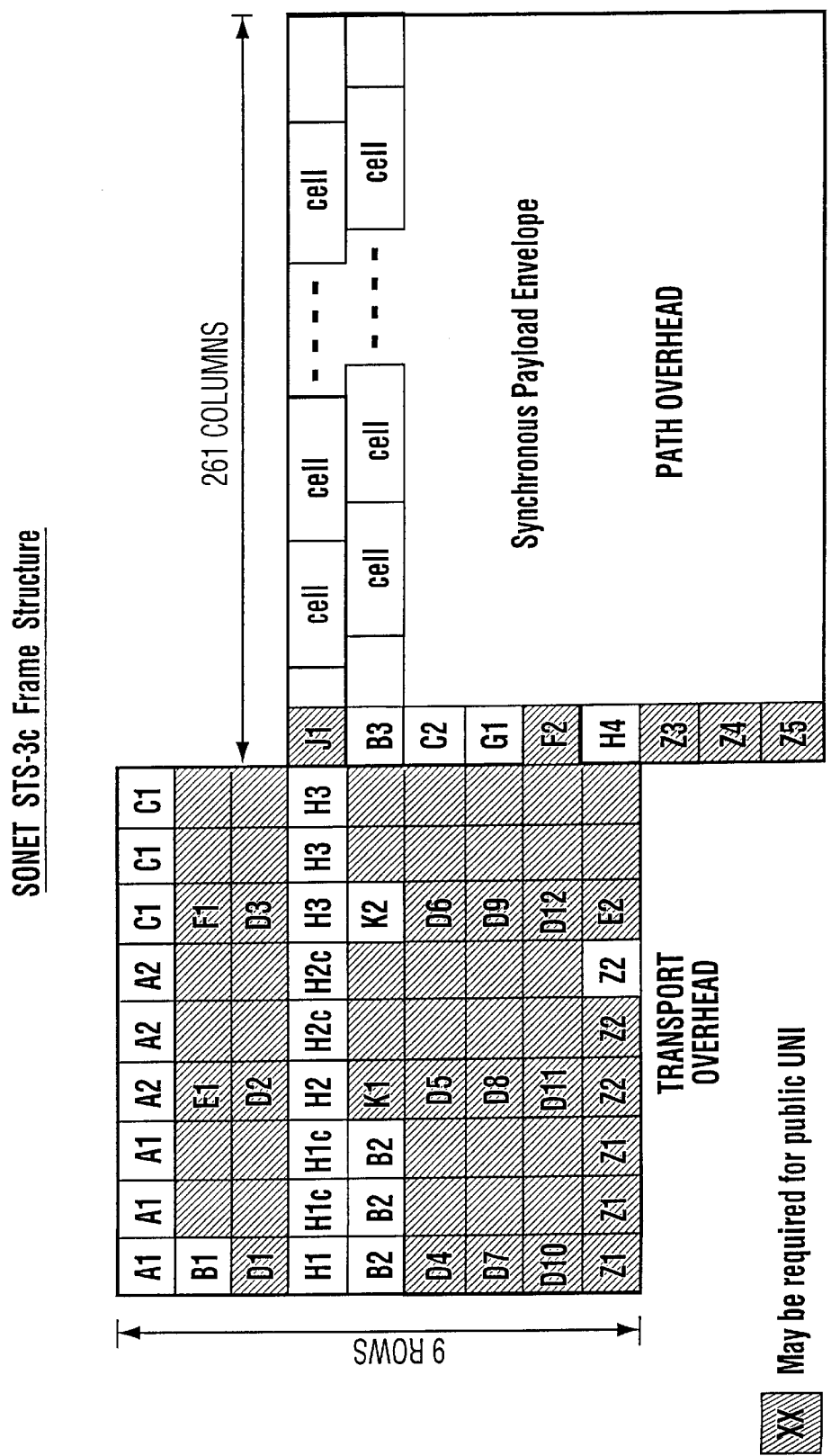
FIG. 3 is a schematic diagram of a SONET STS-3c frame structure.

Referring to FIG. 3 there is shown the frame structure for a SONET STS-3c transmission format. In North America, the SONET standard (ANSI T1.105) was initially released in 1988. The commonly defined interfaces and their associated rates are listed below:

| Interface | Rate (Mbit/s) |
| --- | --- |
| STS-1 | 51.84 |
| STS-3/STS-3c | 155.52 |
| STS-12/STS-12c | 622.08 |
| STS-48 | 2488.32 |

Referring to FIG. 3 there is shown the SONET STS-3c frame structure which consists of 9 rows by 9 columns of transport overhead byte positions, one column of 9 bytes of path overhead and 260 columns of synchronous payload envelope in which ATM cells are placed horizontally and contiguously. Not all of the bytes in the transport overhead are filled. Some of the more important fields are A1 and A2 which specify the frame alignment pattern. In its transmit mode the device 10 inserts the frame alignment pattern (F6F6F6282828H) where the capital letters are the well-known hexidecimal symbols. In the receive mode the device 10 searches the data stream for the SONET frame alignment pattern. When the pattern has been detected for two consecutive frames, the device declares in-frame. When errors are detected in the pattern for four consecutive frames, the device declares out-of-frame.

Field B1 is the Section Bit Interleaved Parity which contains an 8-bit interleaved parity calculated across the entire SONET frame of 2430 bytes. The B1 value is calculated based on even parity, and the value inserted in the current frame is the parity value calculated for the previous frame.

H1, H2, H3 are the payload pointer which, in the transmit direction, may be fixed and in the receive direction is interpreted to locate the J1 byte which represents the first byte of the synchronous payload envelope (SPE). It is used to accommodate the jitter and wander that accumulates in all transmission systems. Pointer movements cause the SPE to move within the SONET frame 3 bytes at a time.

The field B3 is a path 8-bit interleaved parity calculated across the entire synchronous payload envelope.

The field H4 is the ATM Cell Offset which in the transmit direction indicates the offset in bytes to the ext ATM cell boundary in the transmit stream. The byte can be used to delineate cell boundaries in the receive stream. However, cell delineation techniques that use the HEC octet are preferred.

Figure 4:
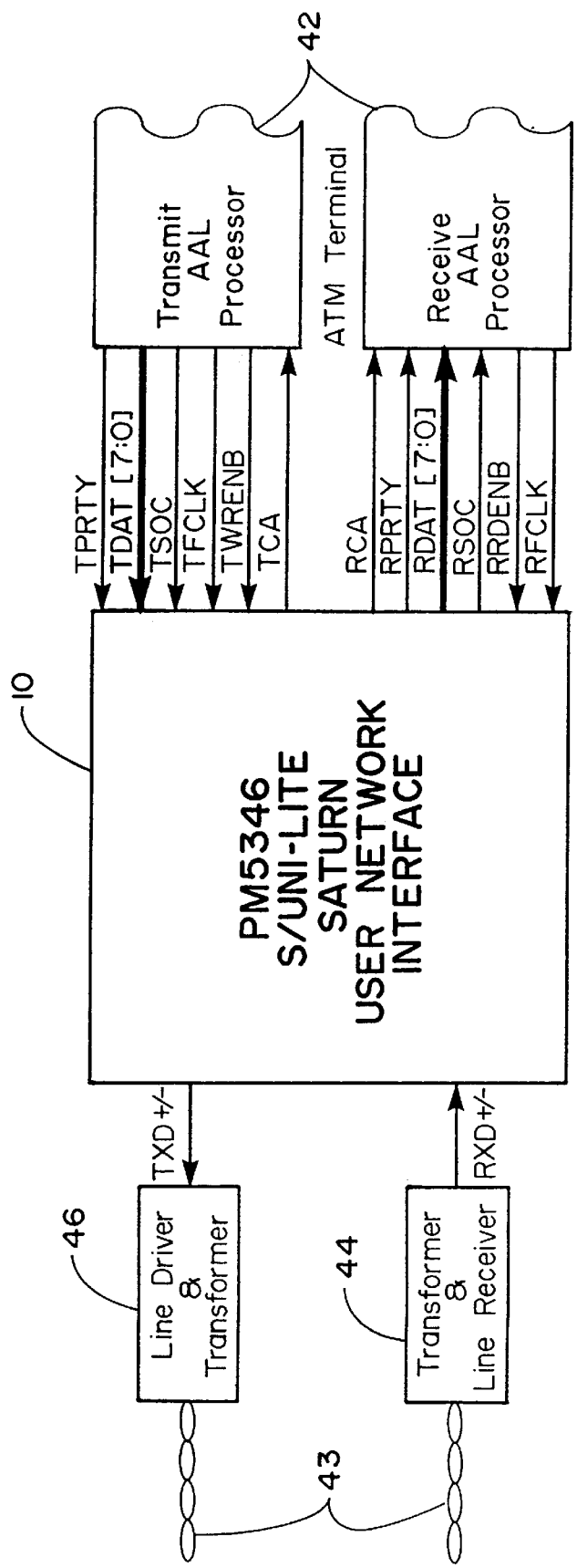
FIG. 4 is a schematic diagram of an application of the user network interface device coupled on its line side to a line receiver/equalizer and a line driver and on the other side to ATM layer processors.

Referring to FIG. 4, the device 10 couples a fibre optic line system 43 with an ATM terminal 42. On the line side an optical receiver 44 receives light signals generated by a remote laser (not shown) and converts them to electrical signals in SONET/SDH frames. The frames are processed by the device 10 which then transmits to the ATM Terminal 42 in the form of ATM cells. It recovers the 155.52 Mbit/s clock signal from the received frames and uses this clock to transmit to the optical transmitter 46. ATM cells received by the device 10 are processed and placed in transmitter 46.

Cell Rate Decoupling

Figure 5:
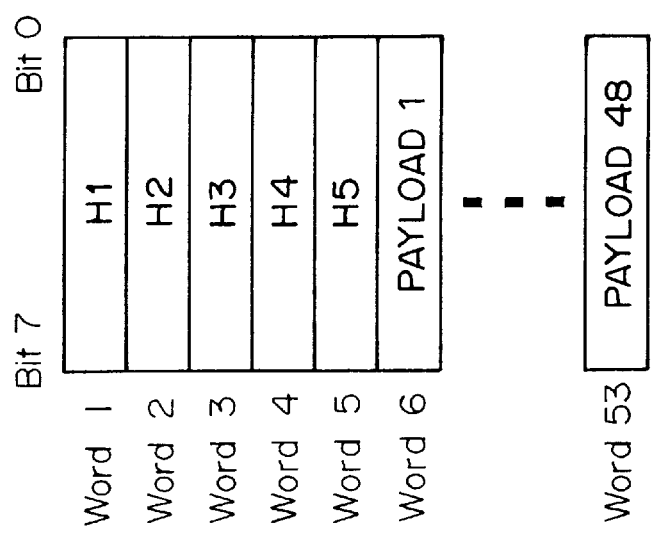
FIG. 5 is a schematic diagram of an 8 bit ATM cell structure.

ATM cells may be passed to/from the ATM cell FIFO 30 using a defined data structure, namely, a 9-bit structure consisting of a start of a cell indication, and an 8-bit wide word as shown in FIG. 5. Here H1 to H5 contain the ATM cell header. Words 6 to 53 contain the ATM cell payload.

Because the ATM cells are asynchronous whereas the SONET/SDH frames are sent at 155.52 Mbit/s, in order to go from one transmission mode to the other, it is necessary to decoupage the timing for the data in one mode from that in the other.

In going from ATM to SONET/SDH, the ATM cells arrive at the transmit side of the ATM cell FIFO 30 at irregular intervals. Consequently, a buffer must be used to temporarily store bytes so that they can then be read out from the buffer at a rate which is synchronized to the desired bit rate for SONET/SDH of 155.52 Mbit/s.

Figure 6:
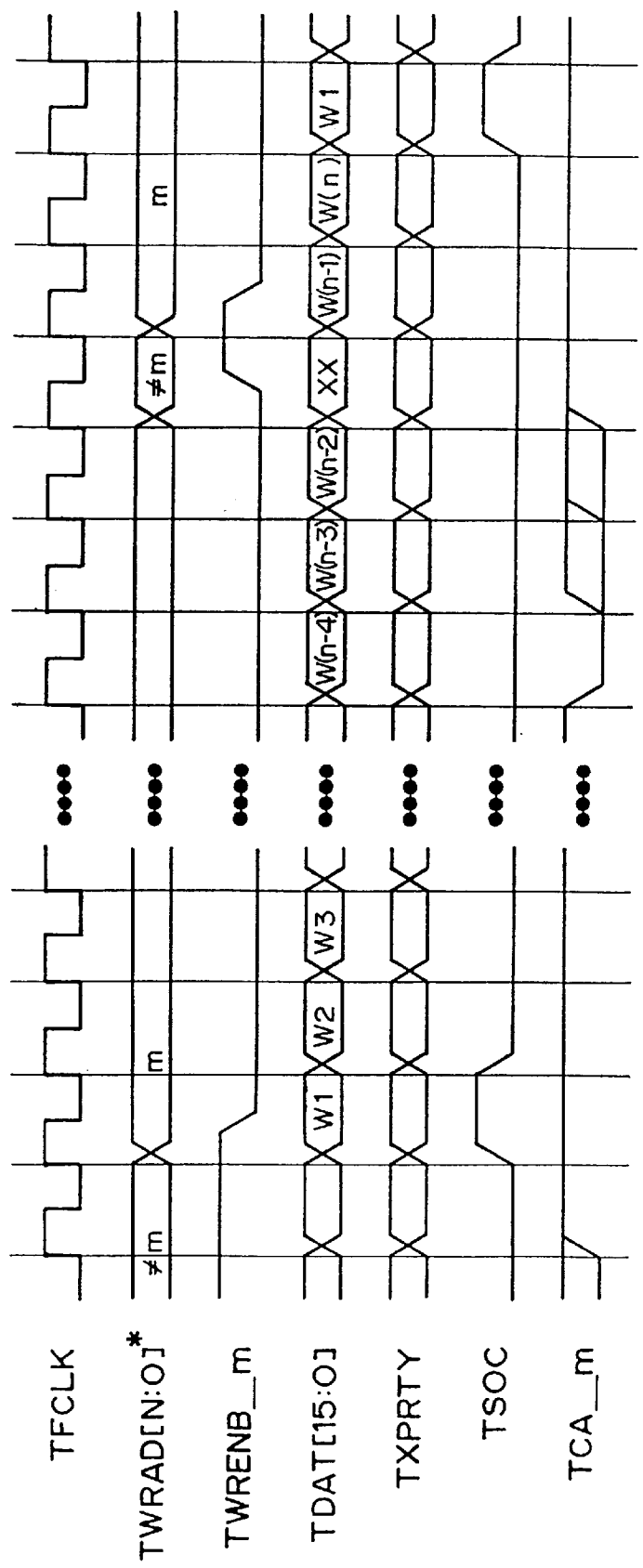
FIG. 6 is a transmit logical timing diagram.

In this case, the buffer is a transmit four cell FIFO 30. ATM cells are stored in the transmit FIFO 30. When FIFO 30 has space for a cell it first sends out a transmit cell available signal (TCA) to notify the external circuitry that a cell may be written to the transmit FIFO 30. To accomplish this, as shown in the timing diagram of FIG. 6, the TCA output transitions from 0 to 1 on the rising edge of the transmit FIFO clock signal TFCLK when the transmit FIFO 30 contains one empty cell. TFCLK is used to synchronize data transfer transactions from an external ATM layer device (not shown). A transmit write enable signal (TWRENB) is used by an external ATM layer device (not shown) to indicate to the device 10 the cycles in which the transmit data (TDAT) on the TDAT bus, the transmit parity (TXPRTY) and the transmit start of cell (TSOC) signals contain valid data. When TWRENB is sampled low by the device 10, interchange data is considered valid. When TWRENB is sampled high by the device 10, interchange data is considered invalid and no transfer is performed. As shown in FIG. 6, there is an additional signal transmit write address bus (TWRAD) which is utilized only for multi-physical layer device applications. It is used to address individual physical layer devices 10 from the external ATM layer device (not shown). The logical timing shown is valid for both single and multiple physical layer operating modes. When TCA is deasserted and it has been sampled, the ATM layer device (not shown) can write no more than four bytes or words to the physical layer device 10. If the ATM layer device writes more than four words and the TCA remains deasserted throughout, the physical layer device will indicate an error condition and ignore additional writes until it asserts TCA again.

Going from SONET/SDH to ATM, ATM cell boundaries must be located in the synchronous payload envelope of each frame, verified and the cells placed in the receive FIFO 26. These cells are then read out of the receive FIFO 26 to external ATM circuitry in response to an active receive read strobe signal from this external circuitry. The data path between an ATM layer and present physical layer device 10 is an 8 bit data path. Clock rates of up to 33 MHz are supported. Transmit and receive data transfers at clock rates independent of line bit rate are achieved using cell rate de coupling using FIFO's 26 and 30. Control signals are provided to both the ATM layer (not shown) and the physical layer device 10 to allow either one to exercise flow control, although normally the physical layer device 10, being at the lowest protocol layer, should operate as a slave.

Figure 7:
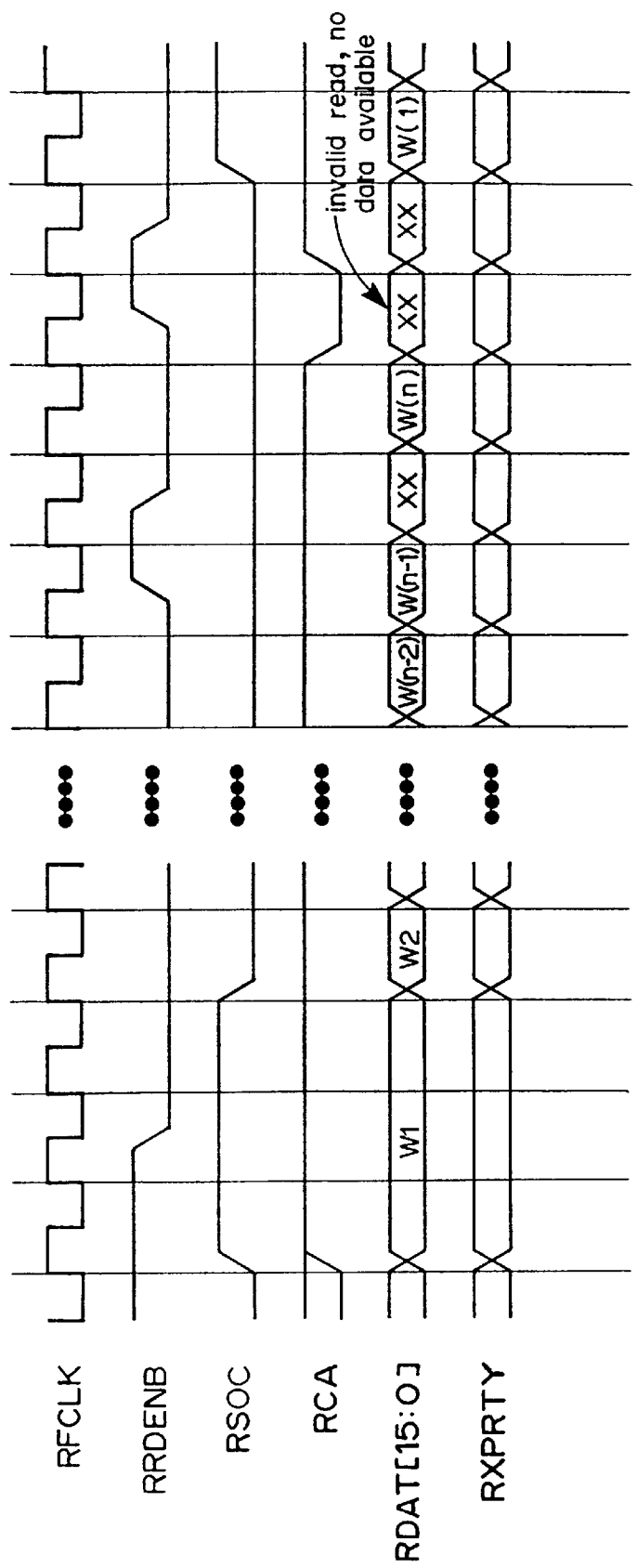
FIG. 7 is a receive timing diagram for a single physical layer device.
Figure 8:
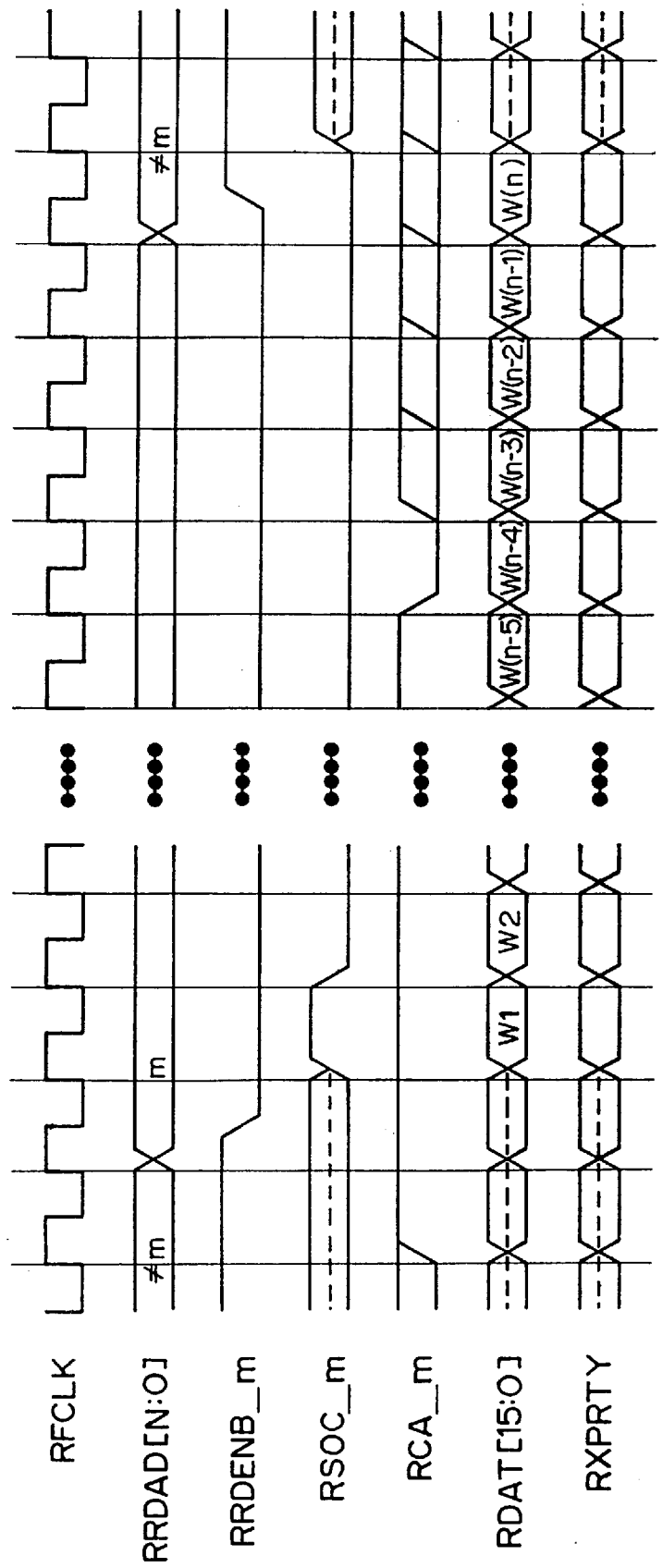
FIG. 8 is a receive timing diagram for a multiple physical layer configuration.

In the receive direction, as shown in FIGS. 7 and 8, when the physical layer device 10 has accumulated a cell in its receive FIFO 26, it informs the ATM layer device that a cell is available to be read by asserting a receive cell available signal RCA. The ATM layer device can then request at least 53 bytes (8 bit mode) from the physical layer device 10 by asserting an enable signal (RRDENB). Receive FIFO clock (RFCLK) cycles at 25 MHz or lower and is used to synchronize data transfer transactions from the physical layer device 10 to an external ATM layer device (not shown). When RRDENB is sampled low by the physical layer device 10, the receive data (RDAT), the receive parity (RXPRTY) and receive start of cell (RSOC) signals will be accepted by the ATM layer device (not shown) on the next rising edge of RFCLK. When RRDENB is sampled high by the physical layer device 10, no transfer is performed in the subsequent RFCLK cycle. As seen for the single physical layer case, RCA remains high until the internal FIFO of the physical layer device is empty. The ATM layer device (not shown) indicates, by asserting the RRDENB signal, that the data on the RDAT bus during the next RFCLK cycle will be read from the physical layer device 10. When the last word of the last cell is available on the RDAT bus, RCA transitions low. Once RCA is deasserted and has been sampled, the ATM layer device (not shown) can issue no additional reads. If the ATM layer device issues more reads than the allowable number, the RCA remains deasserted throughout, the physical layer device 10 will indicated the condition and ignore the additional reads. During multiple physical layer devices mode of operation, several physical layer devices share the RDAT, RSOC and RXPRTY signals. As a result, these signals must be tri-stated in all physical layer devices which have not been selected for reading by the ATM layer (not shown). Selection of which physical layer device is being read is made via dedicated RRDENB signals, or by the encoded physical layer device selection address (RRDAD) in conjunction with a multiple physical layer device read enable signal (RMPRDENB). FIG. 8 shows the timing diagram for the multiple physical layer device near empty mode.

In the transmit direction, when the physical layer device 10 has space for a cell in its transmit FIFO 30, it informs the ATM layer device by asserting a transmit cell available signal (TCA). The ATM layer device can then write at least 53 bytes (8 bit mode) to the physical layer device 10 using an enable signal (TWRENB). For both transmit and receive interfaces the ATM layer device 10 can at any point suspend the transfer by deasserting its enable signal Because in SONET or SDH a continuous stream of cells is transmitted in sequence, whereas in ATM the cell stream is non-continuous, transforming a non-continuous cell stream into a continuous one requires inserting idle or unassigned cells during idle periods in the assigned cell stream. Consequently, in going from SONET to ATM it is necessary to recognize and discard these idle cells. This is done by simply testing the header pattern to determine if it is in the format for an unassigned cell. In the present case the first four octets or bytes in the header will each be 00H if the cell is idle or unassigned.

ATM Cell Delineation

Figure 9:
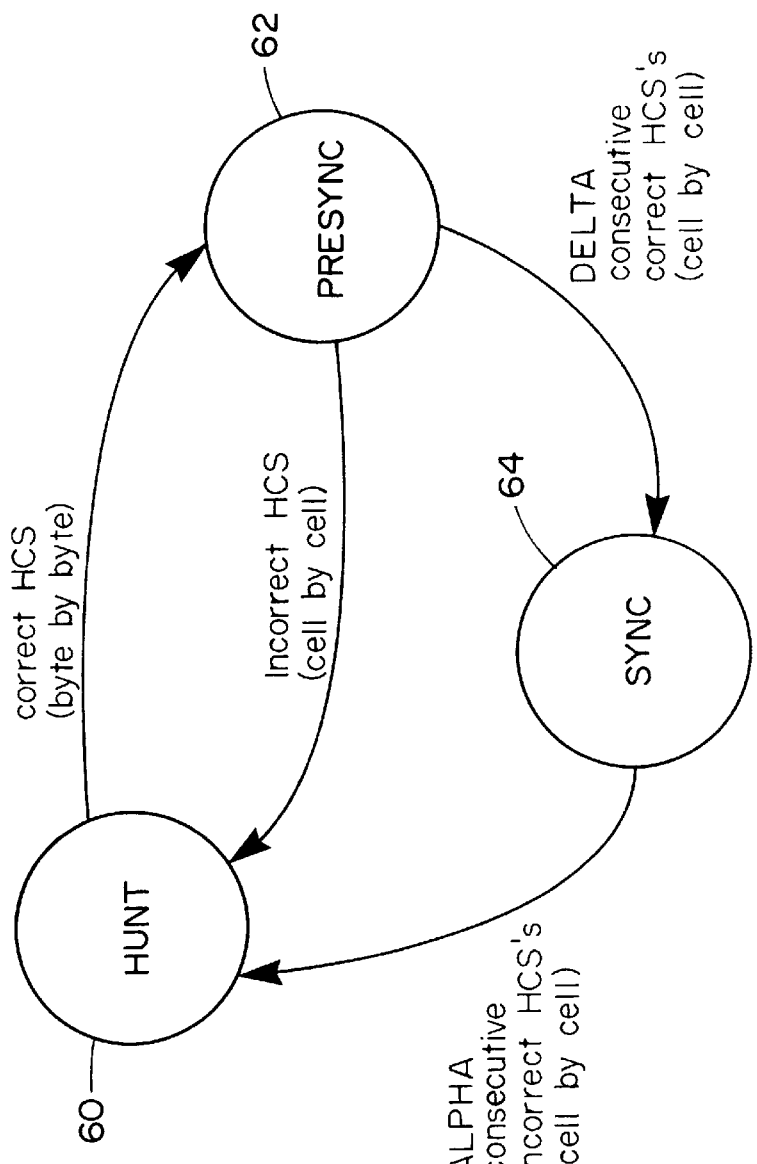
FIG. 9 is a cell delineation state diagram.

Cell delineation is the process of framing to ATM cell boundaries using the header check sequence (HCS) field found in the cell header. The HCS is a cyclic redundancy check calculation over the first 4 octets of the ATM cell header (see FIG. 2). When performing delineation, correct HCS calculations are assumed to indicate cell boundaries. Cells must be byte aligned before insertion in the synchronous payload envelope. Thus, a cell delineation algorithm can search the 53 possible cell boundary candidates one at a time to determine a valid cell boundary location. While searching for the cell boundary location, the cell delineation circuit is in the HUNT state 60 shown in FIG. 9. When a correct HCS is found, a cell delineation state machine (not shown) locks on the particular cell boundary and enters the PRESYNC state 62. This PRESYNC state 62 validates the cell boundary location. If the cell boundary is invalid then an incorrect HCS will be received within the next DELTA cells, at which a transition back to the HUNT state 60 is executed. DELTA is a value to be selected. If no HCS errors are detected in this PRESYNC state 62 then the SYNC state 64 is entered. While in the SYNC state 64, synchronization is maintained until a ALPHA consecutive incorrect HCS patterns are detected, where ALPHA is a value to be selected. In such an event a transition is made back to the HUNT state 60 is executed. The values of ALPHA and DELTA determine the robustness of the delineation method. ALPHA determines the robustness against false misalignments due to bit errors. DELTA determines the robustness against false delineation in the synchronization process. ALPHA is chosen to be 7 and DELTA is chosen to be 6. These values result in a maximum average time to delineate of 31 microseconds.

Figure 10:
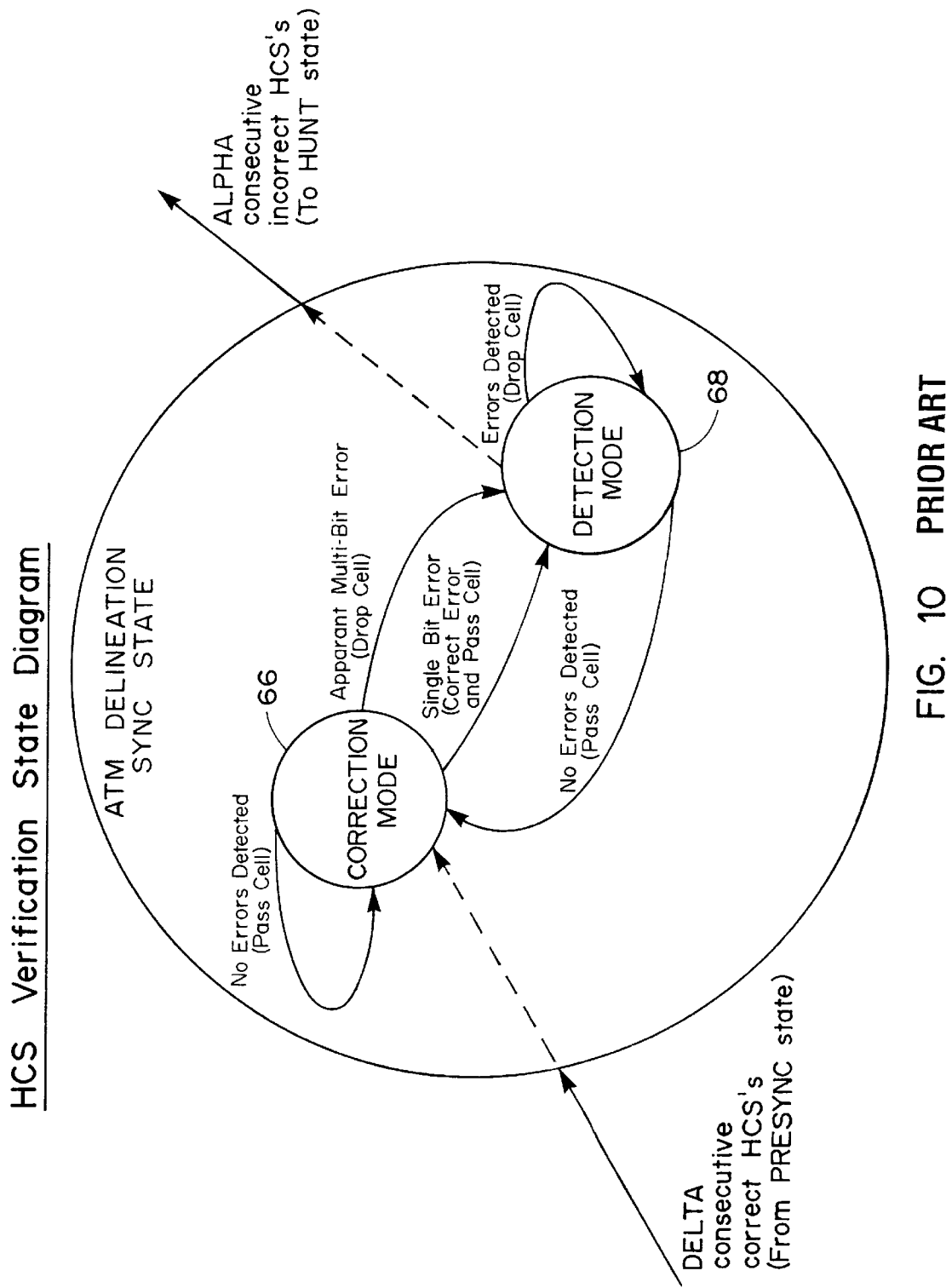
FIG. 10 is an HCS verification state diagram.

Cells are filtered based on HCS errors and/or a cell header pattern. Cell filtering is optional and is enabled through the registers (not shown) of the Receive ATM cell Processor 23. Cells are passed to the receive FIFO 26 while the cell delineation state machine is in the SYNC state 64 as described above. When both filtering and HCS checking are enabled, cells are dropped if uncorrectable HCS errors are detected, or if the corrected header contents match the pattern contained in the 'Match Header Pattern' and 'Match Header Mask' registers. Idle or unassigned cell filtering is accomplished by writing the appropriate cell header pattern into the 'Match Header Pattern' and 'Match Header Mask' registers. Idle/Unassigned cells are assumed to contain the all zeros pattern in the VCI and VPI fields. The 'Match Header Pattern' and 'Match Header Mask' registers allow filtering control over the contents of the GFC, PTI, and CLP fields of the header. The HCS is a cyclical redundancy check calculation over the first 4 octets of the ATM cell header. The RACP block verifies the received HCS using the polynomial, $x^8+x^2+x+1$. The coset polynomial, $x^6+x^4+x^2+1$ is added (modulo 2) to the received HCS octet before comparison with the calculated result. While the cell delineation state machine (referred to above) is in the SYNC state 64, the HCS verification circuit implements the state diagram shown in FIG. 10. In normal operation the HCS verification state machine remains in the 'Correction Mode' state 66. Incoming cells containing no HCS errors are passed to the receive FIFO 26 (of FIG. 1). Incoming single bit errors are corrected, and the resulting cell is passed to the FIFO 26. Upon detection of a single bit error or a multi-bit error, the state machine transitions to the 'Detection Mode' state 68. In this state, the detection of any HCS error causes the corresponding cell to be dropped. Cells containing an error-free HCS are passed, and the state machine transitions back to the 'Correction Mode' state 66.

Clock Recovery

Figure 11:
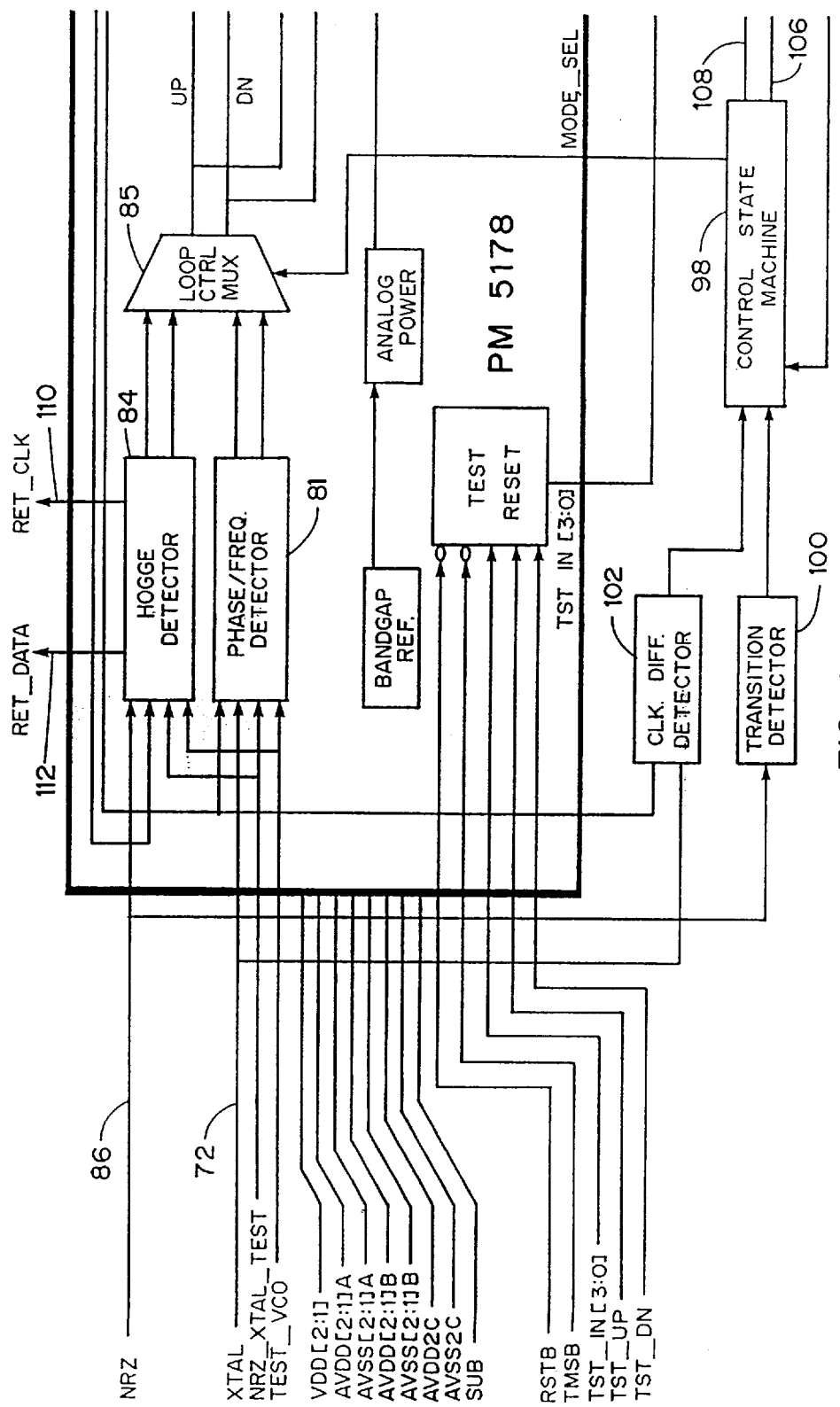
FIG. 11 and FIG. 11a are a schematic diagram of clock recovery circuit.
Figure 11A:
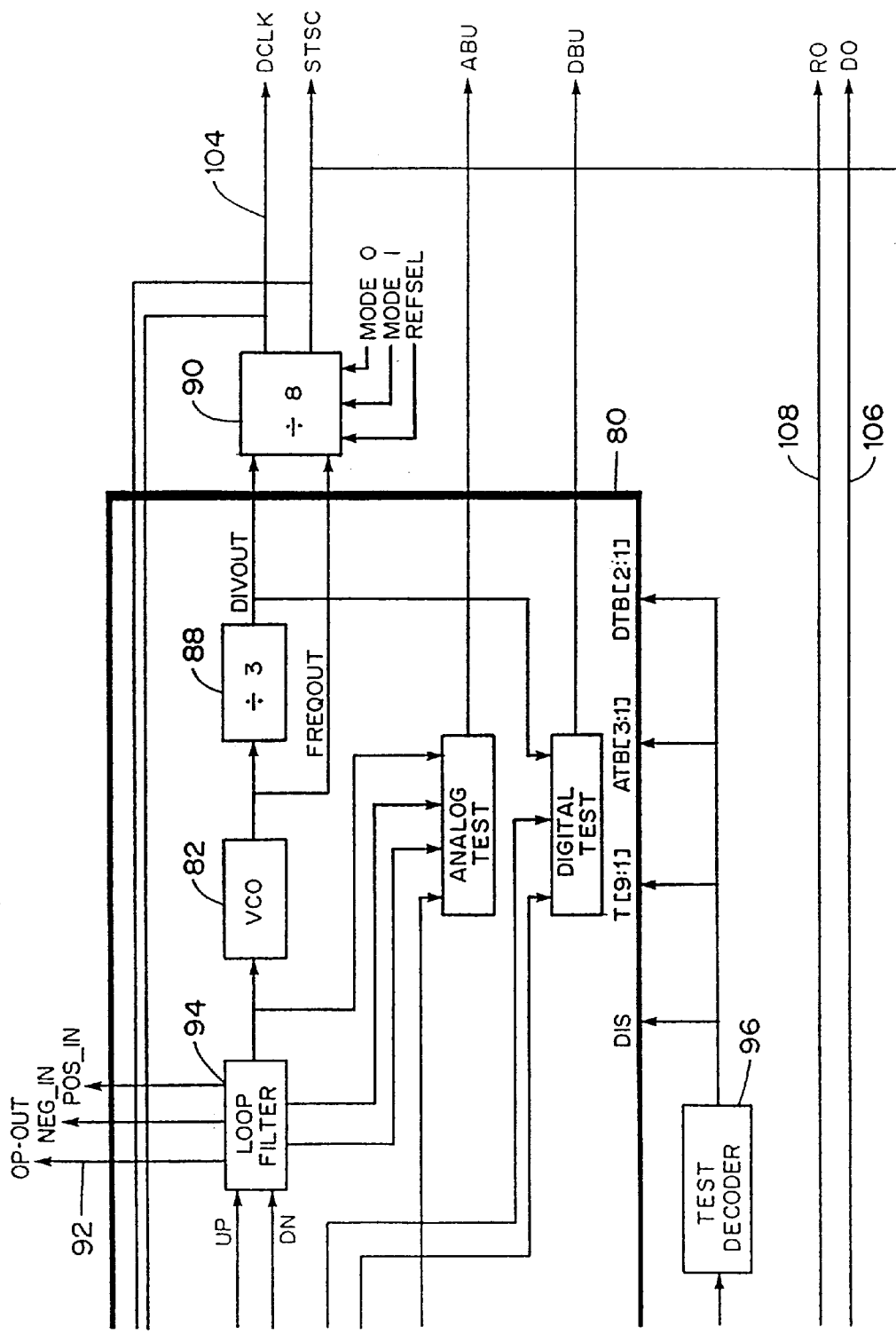

Referring to FIG. 11 and 11a, clock recovery unit 80 recovers the clock from the incoming bit serial data stream. Unit 80 utilizes an external low frequency reference clock signal XTAL on line 72 to train and monitor its voltage controlled oscillator (VCO) 82 associated with its clock recovery phase lock loop. The VCO 82 is a linear voltage-to-current converter (Sedra current conveyor) followed by a current-controlled relaxation oscillator. The VCO 82 operates nominally at 155.52 MHz frequency. The wide adjustment range guarantees that over process, and temperature the VCO 82 is always able to operate at 155.52 MHz. The maximum operating frequency of the VCO 82 is 340 MHz under all operating conditions. The VCO 82 design is optimized for minimum intrinsic jitter generation. In training mode where rapid frequency acquisition is required, the three state phase/frequency detector 81 compares the phase and frequency of the reference clock signal XTAL 72 and the divided down VCO output DCLK 104. Detector 81 has the characteristic that it is always guaranteed to correctly drive the loop filter and VCO 82 towards a true lock condition, regardless of the operating frequency range and gain of the VCO 82. Detector 81 pulls the VCO 82 towards the nominal SONET STS-N operating frequency by locking onto the signal XTAL line 72 generated by an off board crystal reference oscillator (not shown) The XTAL signal on XTAL line 72 provides reference rates of 19.44 MHz and 6.48 MHz. Once the VCO frequency differs from the nominal operating frequency by less than 244 ppm, a Hogge detector 84 is switched in as the phase detector. The Hogge 84 compares the phase of edges in the serial data input stream and the divided down VCO output. The Hogge detector 84 has the characteristic that if the serial data input stream is scrambled (i.e. pseudo-random with 50% ones density), and its bit rate is within 244 ppm of the divided down VCO output clock frequency, the Hogge detector 84 correctly drives the loop filter and VCO 82 towards lock condition. The Hogge detector 84 also samples the serial data input stream, on NRZ 86 in the center of the eye and generates phase aligned clock and retimed data outputs, RET_CLK 110 and the center of the RET_DATA 112. The maximum deviation between the rising edge of $RET_{13}$ CLK 110 and the center of the $RET_{13}$ DATA pulse width is less than 13 degrees or 0.072 UI peak. The Hogge detector 84 acts as synchronizer and decision maker allowing data and clock to be recovered from the incoming non-return to zero (NRZ) input signal 86. Clock recovery unit 80 is robust in its ability to tolerate input jitter and is optimized for very low jitter transfer. Divider circuits 88 and 90 provide division by 8 and 24 for the training aspect of the phase lock loop and division by 1, 3, 6, and 12 for the recovery side. The VCO 82 operates at 155.52 MHz in all configurations. Loop bandwidth varies from 240 KHz to 10 KHz corresponding to cases N=1 and N=24 (the divider ratio between the output and the inputs of the phase locked loop).

The phase detectors 81 and 84 produce correction pulses that determine whether the VCO 82 is running too fast or too slow. These correction pulses are filtered by an active RC filter whose dynamics are optimized to meet and exceed SONET jitter requirements. The passive filters (not shown) that provide feedback around the op amp present in the active filter section of the loop filter 94 are provided externally.

Phase detectors 81 and 84 feed into a loop control multiplexer 85 which selects whether the data recovery phase detector 84 or the reference phase/frequency detector 81 is used to drive the loop filter and control the VCO 82. The loop control multiplexer 85 is controlled by the external control state machine 98.

The output of loop control multiplexer 85 goes to a loop filter 94 shown in FIG. 11 and 11a which cuts out the high frequency components of the phase detector outputs and generates the controlling input of the VCO. The passive network on the input side R1, C1 introduces a higher order pole for blocking spurious modulation noise. The ratio of R2 to R1 sets the midband gain 287/26.6K=0.011. The series connected R2, C2 pairs are external to the chip.

The transition detector 100 monitors the input data stream on the NRZ input and determines whether the transition density is adequate for clock recovery purposes. The transition detector 100 notifies the control state machine 98 if no transitions are present for an interval of 80 bits.

The clock difference detector 102 compares the frequencies of the signals on XTAL line 72 and DCLK 104. Comparisons are done over intervals of 4096 cycles of the signal on XTAL line 72. In each such interval the number of cycles of the signal on DCLK 104 is counted. If this count differs by more than 1, then the control state machine is notified that the signal on XTAL line 72 differs by more than 244 ppm; otherwise, the control state machine 98 is notified that the signals on XTAL line 72 and DCLK 104 differ by less than 244 ppm.

The outputs of the clock difference detector 102 and transition detector 100 are directed to the control state machine 98. The control state machine 98 determines whether clock is recovered from the NRZ input 86 or synthesized from the signal on the XTAL input 72. The control state machine 98 operates the loop control mux 85 and drive the DOOL 106 and ROOL 108 outputs that indicate the status of the device. Upon release of reset, the control state machine 98 forces the loop control mux 85 such that the phase lock loop is referenced to the XTAL signal on XTAL line 72. The DOOL output 106 is forced high indicating that the VCO 98 is not locked to data. The ROOL output 108 is forced high indicating that the VCO 98 is not yet locked to the signal on XTAL line 72. In time the VCO 98 will lock to the signal on XTAL line 72 and the clock difference detector notifies the control state machine 98 that the inputs to the phase/frequency detector 81 differ by less than 244 ppm. At this point the control state machine 98 will force the ROOL output 108 low, indicating that the VCO 82 is locked to the signal on XTAL 72 and thus trained to within 244 ppm of the nominal SONET/SDH bit rate expected on the NRZ input 86.

Once the VCO 82 is locked to the reference, the control state machine 98 waits until the transition detector 100 indicates that the transition density is high enough (no more than eighty consecutive ones or zeros) on the NRZ input signal 86. Then the control state machine 98 switches the loop control mux 85 over the Hogge detector 84. At this point, the DOOL output is forced low indicating that the VCO 82 is locked to data. While the VCO 82 is locked to data, the control state machine 98 continues to monitor transition density on NRZ and frequency offset between the signal on XTAL line 72 and DCLK 104.

If the transition detector 100 indicates that transition density is poor (more than eighty consecutive ones or zeros occur), then the control state machine switches the loop control mux 85 such that the VCO 82 is once again controlled by XTAL on XTAL line 72. At this point DOOL 106 is forced high. ROOL 108 is forced to remain low until an interval passes that is adequate to allow the VCO 82 to lock to the XTAL signal on XTAL line 72. Then the VCO 82 is once again considered trained to the reference, or determined to be out of lock, at which point ROOL 108 would be brought high. Once the VCO 82 is trained to the XTAL signal on XTAL line 72, the control state machine 98 again determines when to switch to tracking data on NRZ 86.

Similarly, if the clock difference detector indicates that DCLK 104 and the XTAL signal on XTAL line 72 differ by more than 244 ppm, then the control state machine 98 switches the loop control mux 85 such that the VCO 82 such that the VCO 82 is once again controlled by XTAL 72. At this point DOOL 106 is forced high. ROOL 108 is forced to remain low until an interval passes that is adequate to allow the VCO 82 to lock to XTAL signal on XTAL line 72. Then the VCO 82 is once again considered trained to the reference, or determined to be out of lock at which point ROOL 108 would be brought high. Once the VCO 82 is trained to the XTAL signal on XTAL line 72, the control state machine 98 again determines when to switch to tracking data on NRZ 86.

External blocks consist of a divide-by-8 90 which is a synchronous counter, a test decoder 96 which is a test circuitry decoding block, a transition detector 100 which is a synchronous counter, a frequency difference detector 102 which is a synchronous counter, a control state machine 98, a decoder circuit 96 for setting operating modes and active filter passives, the resistive and capacitive elements accompanying the op amp based loop filter 94. The divide-by-8 circuit 90 interfaces with the internal divide-by-3 circuit 88 to generate feedback signals for both sides of the loop. A test decoder 96 sets up diagnostic and production test setups within the circuit 80 when in test mode (TMSB=0). The state machine 98 determines whether the loop is in training mode or recovery mode. The transition detector 100 and frequency difference detector 102 supply state machine 98 with signals relating the state of the loop at any given time. The off-chip passives consist of two resistors and two capacitors (not shown).

When in reset (RSTB=0) the VCO is shut off by grounding the integrating capacitor in the active loop filter. The frequency difference detector 82 is shut off by grounding the integrating capacitor (see FIG. 11 and 11a) in the active loop filter 94. The frequency difference detector 82 sends the loop in training mode by forcing the state machine output MODE$_{13}$ SEL low. The Data Out of Lock (DOOL) 106 and Range Out Of Lock (ROOL) 108 outputs on the state machine 98 both go high. Once the frequency of DCLK 104 is within 244 ppm of the reference frequency on XTAL line 72, ROOL 108 goes low and the loop switches over to recovery mode. Once the Hogge detector 84 acquires phase lock, DOOL 106 goes low and error free data recovery begins.

Clock Synthesis

Figure 12:
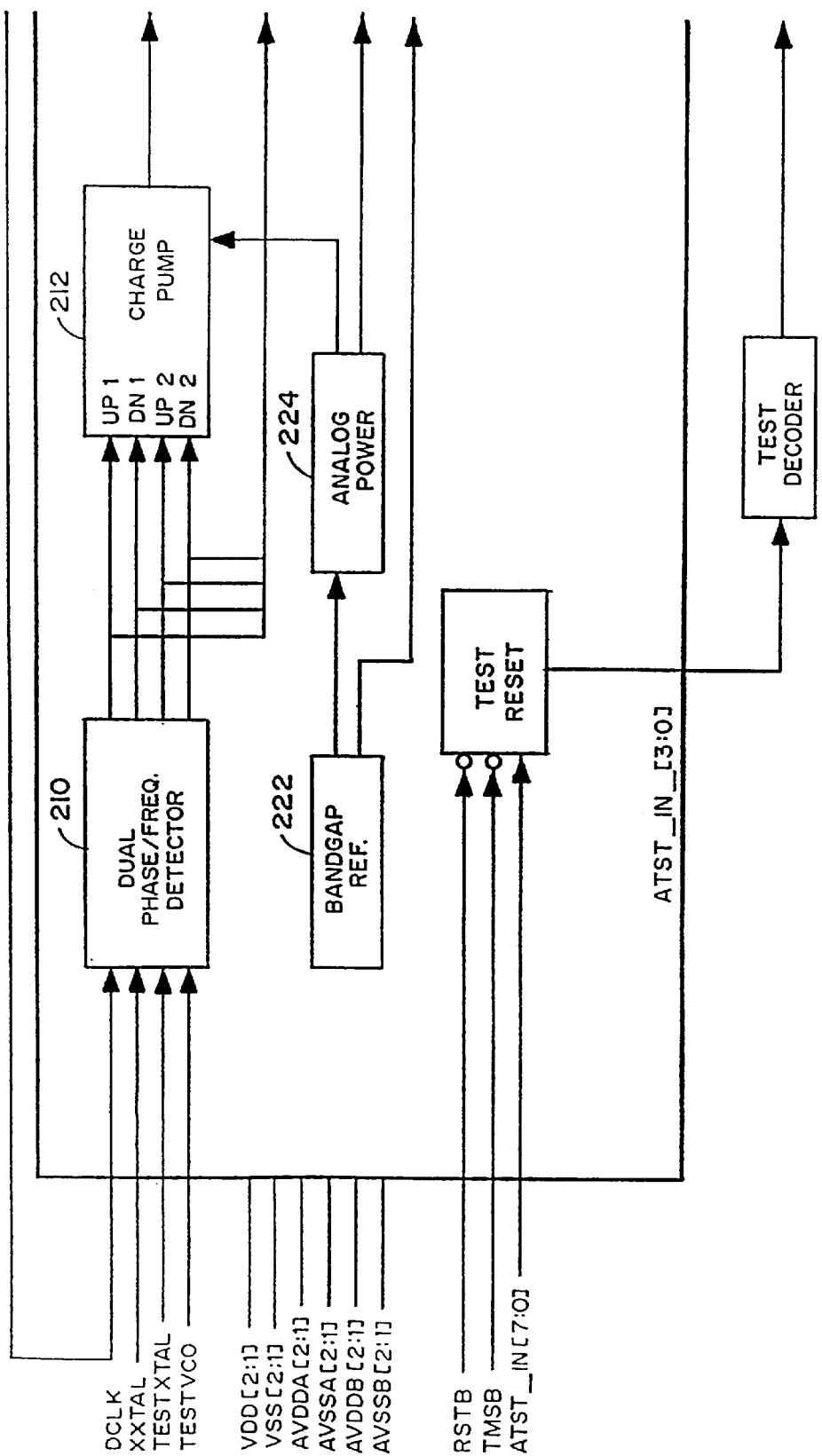
FIG. 12 and FIG. 12a are a schematic diagram of the clock synthesis circuit.
Figure 12A:
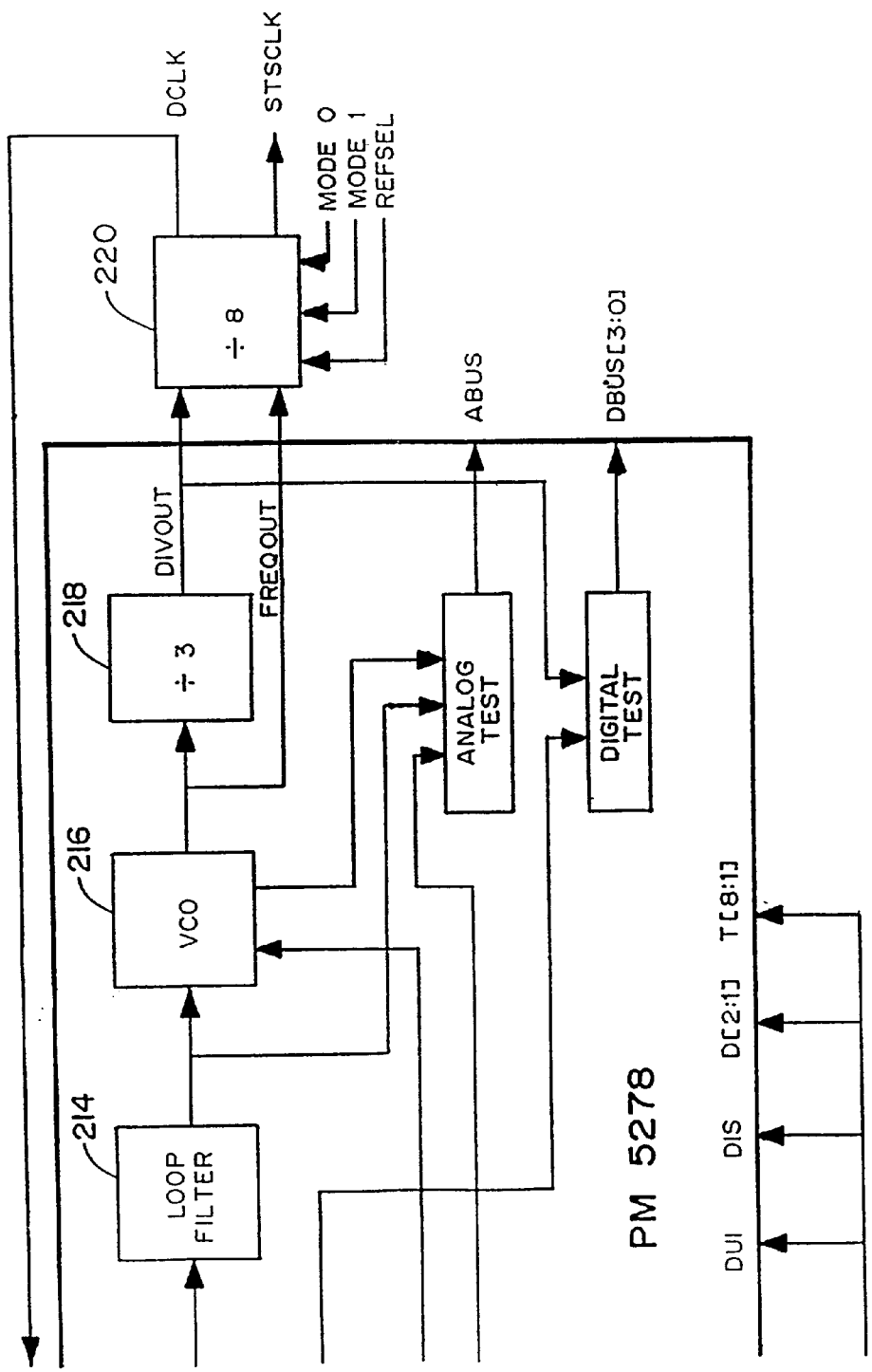

Referring to FIG. 12 and 12a, clock synthesis is achieved using an integral phase locked loop that synthesizes the high speed 155.52 MHz or 51.84 MHz transmit clock from a low frequency reference so as to avoid the high cost of a 155.52 MHz or 51.84 MHz crystal oscillator. The synthesizer has a dual phase/frequency detector 210 that drives a charge pump 212. The charge pump 212 controls current into the loop filter 214 which is coupled to the output of the charge pump 212. A voltage controlled oscillator (VCO) 216 is coupled to the output of the loop filter 214. The charge pump 212 sources currents into the loop filter 214 to raise the VCO control voltage or sink currents to bring the VCO control voltage down. The output of the VCO is directed through a divide by three circuit 218 and then by a divide by eight circuit 220. The loop filter transfer function is optimized to enable the phase lock loop to track the reference yet attenuate high frequency jitter on the reference signal. This transfer function yields a typical low pass corner of 736 KHz when referenced to a 19.44 MHz crystal and 245 KHz when referenced to a 6.48 MHz crystal. Above these corners reference jitter is attenuated. With a jitter free reference, intrinsic jitter generation is less than 0.01 UI RMS as measured through a high pass filter with a 12 KHz cutoff frequency.

There are two "up" and two "down" outputs from the dual phase/frequency detectors 210 Each output can independently sink or source a current into the loop filter 214. The dual phase/frequency detector 210 produces two transfer functions which are displace to either side of the origin and exhibit a deadband region around the origin caused by the inability of the phase/frequency detectors to react to an incrementally small phase difference between the inputs which normally occurs when the loop is in phase lock. The output currents of the charge pump are summed to yield an equivalent phase/current transfer curve which exhibits no deadband region around the origin. This scheme greatly reduces the jitter associated with 3-state sequential phase/ frequency detectors.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. A user network interface (UNI) device for interfacing between a synchronous optical network (SONET) and an asynchronous transfer mode (ATM) network, the user network interface device comprising:

(a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, wherein the transmit section includes an integral clock synthesis circuit operative to synthesize a high speed transmit clock from a low frequency reference source; and (b) a receive section operative to receive incoming frames of data in an incoming continuous stream of data, extract ATM cells from the incoming frames of data, and transmit the extracted ATM cells in an outgoing non-continuous stream of data cells, wherein the receive section includes an integral clock recovery circuit operative to sample and recover clock from the incoming continuous stream of data.

2. A user network interface (UNI) device for interfacing between a synchronous optical network (SONET) and an asynchronous transfer mode (ATM) network, the user network interface device comprising:
(a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, wherein the transmit section includes an integral clock synthesis circuit operative to synthesize a high speed transmit clock from a low frequency reference source; and
(b) a receive section operative to receive incoming frames of data in an incoming continuous stream of data, extract ATM cells from the incoming frames of data, and transmit the extracted ATM cells in an outgoing non-continuous stream of data cells, wherein the receive section includes an integral clock recovery circuit operative to sample and recover clock from the incoming continuous stream of data, the integral clock recovery circuit including:
  (aa) a first voltage control oscillator (vco), having an input and a divided down output, operative to lock on to the incoming continuous stream of data;
  (bb) a phase/frequency detector operative to compare a first reference clock signal and a divided down output signal from the first VCO and to drive the first VCO to lock on to the first reference clock signal;
  (cc) a data phase detector operative to compare a phase of the incoming continuous stream of data and the divided down output signal from the first VCO and to drive the first VCO towards a lock condition with the incoming continuous stream of data; and
  wherein the first VCO is switched from the phase/frequency detector to the data phase detector when a frequency difference between a frequency of the divided down output signal from the first VCO and that of the first reference clock signal is less than or equal to a predetermined threshold, and the first VCO is switched back to the phase/frequency detector when the frequency difference exceeds the predetermined threshold.

3. A device according to claim 2, wherein said user network interface includes means for monitoring a transition density of the incoming continuous stream of data,
wherein clock is recovered from the incoming continuous stream of data only if the incoming continuous stream of data has a number of transitions greater than or equal to a preset value for an n-bit interval.

4. A method according to claim 3, wherein the preset value is 1 and the n-bit interval is an 80-bit interval.

5. A user network interface (UNI) device for interfacing between a synchronous optical network (SONET) and an asynchronous transfer mode (ATM) network, the user network interface device comprising:
(a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, wherein the transmit section includes an integral clock synthesis circuit operative to synthesize a high speed transmit clock from a low frequency reference source; and
(b) a receive section operative to receive incoming frames of data in an incoming continuous stream of data, extract ATM cells from the incoming frames of data, and transmit the extracted ATM cells in an outgoing non-continuous stream of data cells, wherein the receive section includes an integral clock recovery circuit operative to sample and recover clock from the incoming continuous stream of data, the integral clock recovery circuit including:
  (aa) a first reference clock input line for receiving a first reference clock signal and a data input line for receiving the incoming continuous stream of data;
  (bb) a first voltage control oscillator (VCO), having an input and an output, operative to lock on to the incoming continuous stream of data;
  (cc) a first divider circuit operative to divide down output signals from the first VCO;
  (dd) a phase/frequency detector operative to compare the phase and frequency of the first reference clock signal and the divided down output signal from the first divider circuit;
  (ee) a data phase detector operative to compare the phase of the incoming continuous stream of data and the divided down output signal from the first divider circuit;
  (ff) driving and controlling means for driving and controlling the first VCO from one of the data phase detector and the phase/frequency detector; and
  wherein said driving and controlling means drives the first VCO from the phase/frequency detector when a frequency difference between the frequency of the divided down output signal from the first divider circuit and that of the external reference clock signal exceeds a predetermined threshold, and drives the first VCO from the data phase detector when the frequency difference is less than or equal to the predetermined threshold.

6. A device according to claim 5, wherein said user network interface includes means for monitoring a transition density of the incoming continuous stream of data,
wherein clock is recovered from the incoming continuous stream of data only if the incoming continuous stream of data has a number of transitions greater than or equal to a preset value for an n-bit interval.

7. A device according to claim 6, wherein the preset value is 1 and the n-bit interval is an 80-bit interval.

8. A device according to claim 5, wherein the predetermined threshold is 244 parts per million (ppm).

9. A device according to claim 5, wherein the driving and controlling means for driving and controlling the first VCO includes:
a loop control multiplexer operative to selectively drive and control the first VCO from one of the phase/frequency detector and the data phase detector, having an output coupled to the first VCO and an input coupled to an output of each of the phase/frequency detector and the data phase detector.

10. A device according to claim 9, wherein the clock recovery circuit includes a loop filter operative to cut out high frequency components of input signals and to control input of the first VCO, the loop filter having an output coupled to the input of the first VCO, and an input coupled to an output of the loop control multiplexer.

11. A device according to claim 6, wherein the external reference clock signal is 19.44 MHz or 6.48 MHz.

12. A device according to claim 6, wherein the first divider circuit includes a divide-by-three circuit coupled to a divide-by-eight circuit.

13. A device according to claim 6, wherein the transmit section includes an integral clock synthesis circuit operative to synthesize a high speed transmit clock from a low frequency reference source.

14. A user network interface (UNI) device for interfacing between a synchronous optical network (SONET) and an asynchronous transfer mode (ATM) network, the user network interface device comprising:
   (a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, the transmit section including:
      (i) an integral clock synthesis circuit operative to synthesize a high speed transmit clock from a low frequency reference source; and
   (b) a receive section operative to receive incoming frames of data in an incoming continuous stream of data, extract ATM cells from the incoming frames of data, and transmit the extracted ATM cells in an outgoing non-continuous stream of data cells.

15. A user network interface device for interfacing between a synchronous optical network (SONET) and an asynchronous transfer mode (ATM) network, the user network interface device comprising:
   (a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, the transmit section including an integral clock synthesis circuit operative to synthesize a high speed transmit clock from a low frequency reference source, said integral clock synthesis circuit having:
      (aa) a voltage controlled oscillator (VCO);
      (bb) a divider circuit having an input coupled to an output of the (VCO);
      (cc) a loop filter having an output coupled to an input of the VCO;
      (dd) a charge pump coupled to the loop filter and operative to send source currents and sink currents into the loop filter to control the VCO;
      (ee) a reference clock line for receiving a reference clock signal; and
      (ff) a dual phase frequency detector operative to drive the charge pump, having an input coupled to an output of the divider circuit and the reference clock line;
   (b) a receive section operative to receive incoming frames of data in an incoming continuous stream of data, extract ATM cells from the incoming frames of data, and transmit the extracted ATM cells in an outgoing in non-continuous stream of data cells.

16. A device according to claim 15, wherein the loop filter has a transfer function optimized to enable the integral clock synthesis circuit to track the reference clock signal and attenuate high frequency jitter on the reference clock signal.

17. A device according to claim 16, wherein the transfer function yields a low pass corner frequency of 736 KHz when referenced to a 19.44 MHz crystal.

18. A device according to claim 16, wherein the transfer function yields a low pass corner frequency of 245 KHz when referenced to a 6.48 MHz crystal.

19. A user network interface (UNI) device for interfacing between a synchronous optical network (SONET) and an asynchronous transfer mode (ATM) network, the user network interface device comprising:
   (a) a transmit section operative to receive an incoming non-continuous stream of data cells from the ATM network, generate and insert idle cells into the incoming non-continuous stream of data cells to form a continuous stream of cells, map the continuous stream of cells into frames of data, and synchronously transmit the frames of data in an outgoing continuous stream of data, the transmit section including:
      (i) an integral clock synthesis circuit operative to synthesize a high speed transmit clock from a low frequency reference source; and
   (b) a receive section operative to receive incoming frames of data in an incoming continuous stream of data, extract ATM cells from the incoming frames of data, and transmit the extracted ATM cells in an outgoing non-continuous stream of data cells, the receive section having an integral clock recovery circuit operative to sample and recover clock from an incoming encoded stream of data, the integral clock recovery circuit including:
      (i) a first reference clock input line for receiving a first reference clock signal and a data input line for receiving the incoming continuous stream of data;
      (ii) a first voltage control oscillator (VCO) operative to lock on to the incoming continuous stream of data;
      (iii) a first divider circuit operative to divide down output signals from the first VCO, and having an input coupled to an output of the first VCO;
      (iv) a first loop filter operative to cut out high frequency components of input signals and to control input of the first VCO, having an output coupled to an input of the first VCO;
      (v) a phase/frequency detector, operative to compare phase and frequency of the first reference clock signal and a divided down first VCO output from the first divider circuit, having an input coupled to an output of the first divider circuit and the first reference clock input line;
      (vi) a data phase detector operative to compare phase of the incoming continuous stream of data and the divided down first VCO output signal, having an input coupled to the data input line and to the first divider circuit;
      (vii) a loop control multiplexer operative to selectively drive the loop filter and control the first VCO from one of the phase/frequency detector and the data phase detector, having an output coupled to an input of the loop filter and an input coupled to an output of the phase/frequency detector and the data phase detector;
      (viii) a transition detector operative to monitor a transition density of the incoming continuous stream of data;
      (ix) a clock difference detector, operative to compare a frequency of the first reference clock signal and the divided down output signal of the first VCO, having an input coupled to the first reference clock input line and the first divider circuit; and (x) a control state machine operative to control the control loop multiplexer, having an input coupled to each of the clock difference detector, the transition detector and the first divider circuit, and an output coupled to the loop control multiplexer;

wherein the control state machine operates the control loop multiplexer to drive and control the first VCO from the data phase detector when a frequency difference between the divided down output signal from the first VCO and the first reference clock signal is less than or equal to a predetermined threshold and clock is recovered from the incoming continuous stream of data only if the incoming continuous stream of data has a number of transitions greater than or equal to a preset value for an n-bit interval and where otherwise the control state machine operates the control loop multiplexer to drive and control the first VCO from the phase/frequency detector.

20. A device according to claim 19, wherein the preset value is 1 and the n-bit interval is an 80-bit interval.

21. A device according to claim 19, wherein the first reference clock signal is 19.44 MHz or 6.48 MHz.

22. A device according to claim 19, wherein the predetermined threshold is 244 parts per million (ppm).

23. A device according to claim 19, wherein the integral clock synthesis circuit includes:
(aa) a second voltage control oscillator (VCO);
(bb) a second divider circuit having an input coupled to an output of the second VCO;
(cc) a second loop filter having an output coupled to an input of the second VCO;
(dd) a charge pump coupled to the second loop filter and operative to send source currents and sink currents into the second loop filter to control the second VCO;
(ee) a second reference clock line for receiving a second reference clock signal; and
(ff) a dual phase/frequency detector operative to drive the charge pump, having an input coupled to an output of the second divider circuit and the second reference clock line.

24. A device according to claim 23, wherein the second divider circuit includes a divide-by three circuit coupled to a divide-by eight circuit.

25. A device according to claim 23, wherein the second loop filter has a transfer function optimized to enable the integral clock synthesis circuit to track the second reference clock signal and attenuate high frequency jitter on the second reference clock signal.

26. A device according to claim 25, wherein the transfer function yields a low pass corner frequency of 736 KHz when referenced to a 19.44 MHz crystal.

27. A device according to claim 25, wherein the transfer function yields a low pass corner frequency of 245 KHz when referenced to a 6.48 MHz crystal.

28. A user network interface (UNI) device for interfacing between a synchronous optical network (SONET) and an asynchronous transfer mode (ATM) network, the user network interface device comprising:
(a) a transmit section operative to receive an incoming non-continuous stream of data cells from the ATM network, the transmit section comprising:
(i) a transmit cell buffer operative to receive and store incoming data cells from the incoming non-continuous stream of data cells;
(ii) a transmit section processor operative to generate and insert idle cells into the incoming non-continuous stream of data cells to form a continuous stream of cells and to map the continuous stream of cells into outgoing frames of data, the transmit section processor having an input coupled to an output of the transmit cell buffer;
(iii) a parallel-to-serial converter having an input coupled to an output of the transmit section processor;
(iv) an encoder, having an input coupled to an output of the parallel-to-serial converter, operative to encode data received from the parallel-to-serial converter; and
(v) an integral clock synthesis circuit coupled to the encoder and operative to synthesize a high speed transmit clock from a low frequency reference source;
wherein the receive section transmits the outgoing frames of data in an outgoing continuous stream of data directed to the synchronous optical network; and
(b) a receive section operative to receive incoming frames of data in an incoming continuous stream of data from the synchronous optical network, each incoming frame of data having a synchronous payload envelop for storing data cells, the receive section comprising:
(i) a serial interface;
(ii) a decoder operative to recover data from the incoming continuous stream of data and having an input coupled to the serial interface;
(iii) an integral clock recovery circuit operative to sample and recover clock from the incoming continuous stream of data, having an output coupled to an input of the decoder;
(iv) a serial-to-parallel converter having an input coupled to an output of the decoder;
(v) a receive section processor operative to extract data cells from the incoming frames of data, having an input coupled to an output of the serial-to-parallel converter; and
(vi) a receive cell buffer operative to store the extracted data cells for transmission in an outgoing non-continuous stream of data cells, having an input coupled to an output of the receive section processor;
wherein the receive section transmits the extracted data cells in an outgoing non-continuous stream of data to the ATM network.

29. A device according to claim 28, wherein the integral clock recovery circuit includes:
(aa) a first voltage control oscillator (VCO), having an input and a divided down output, operative to lock on to the incoming continuous stream of data;
(bb) a phase/frequency detector operative to compare a first reference clock signal and a divided down output signal from the first VCO and to drive the first VCO to lock on to the first reference clock signal; and
(cc) a data phase detector operative to compare a phase of the incoming continuous stream of data and the divided down output signal from the first VCO and to drive the first VCO towards a lock condition with the incoming continuous stream of data; and
wherein the first VCO is switched from the phase/frequency detector to the data phase detector when a frequency difference between a frequency of the divided down output signal from the first VCO and that of the first reference clock signal is less than or equal to a predetermined threshold, and the first VCO is switched back to the phase/frequency detector when the frequency difference exceeds the predetermined threshold.

30. A device according to claim 29, wherein the integral clock synthesis circuit includes:
   (aa) a second voltage control oscillator (VCO);
   (bb) a second divider circuit having an input coupled to an output of the second VCO;
   (cc) a second loop filter having an output coupled to an input of the second VCO;
   (dd) a charge pump coupled to the second loop filter and operative to send source currents and sink currents into the second loop filter to control the second VCO;
   (ee) a second reference clock line for receiving a second reference clock signal; and
   (ff) a dual phase/frequency detector operative to drive the charge pump, having an input coupled to an output of the second divider circuit and the second reference clock line.

31. A device according to claim 30, wherein said user network interface includes means for monitoring a transition density of the incoming continuous stream of data, and
   wherein clock is recovered from the incoming continuous stream of data only if the incoming continuous stream of data has a number of transitions greater than or equal to a preset value for an n-bit interval.

32. A device according to claim 31, wherein said transmit section processor includes:
   (aa) a transmit cell processor operative to generate and insert cells into the incoming non-continuous stream of data cells to form the continuous stream of cells; and
   (bb) a transmit framer and overhead processor having an input coupled to an output of the transmit cell processor and operative to map the continuous stream of cells into the outgoing frames of data.

33. A method according to claim 31, wherein the preset value is 1 and the n-bit interval is an 80-bit interval.

34. A device according to claim 31, wherein the predetermined threshold is 244 parts per million (ppm).

35. A method, in a user network interface (UNI) device interfacing between a synchronous optical network (SONET) and an asynchronous transfer mode (ATM) network, for recovering clock from an incoming continuous stream of data received by the UNI device from the synchronous optical network, the UNI device having an integral clock recovery circuit which includes a first voltage control oscillator (vCo), a divider circuit and a phase/frequency detector, the method comprising the steps of:
   (a) generating a divided down clock signal in the UNI device, including:
      (i) driving the first VCO with the phase/frequency detector; and
      (ii) dividing down output from the first VCO with the divider circuit;
   (b) testing if a frequency of a reference clock signal and a frequency of the divided down clock signal differs by no more than a predetermined threshold;
   (c) synchronizing the integral clock recovery circuit to a phase and a frequency of the incoming continuous stream of data, if the test in step (b) produces a result of true; and
   (d) recovering clock from the incoming continuous data stream in the event the phase and frequency are synchronized in step (c), including testing if the incoming continuous stream of data has a number of transitions greater than or equal to a preset value for an n-bit interval;
   wherein the clock from the incoming continuous stream of data is recovered in step (d) if the number of transitions is greater than or equal to the preset value for the n-bit interval.

36. A method according to claim 35, wherein the clock recovery circuit further includes a data phase detector, and step (c) includes the step of:
   switching from the phase/frequency detector to the data phase detector to drive the first VCO.

37. A method, in a user network interface (UNI) device interfacing between a synchronous optical network (SONET) and an asynchronous transfer mode (ATM) network, for recovering clock from an incoming continuous stream of data received by the UNI device from the synchronous optical network, the UNI device having an integral clock recovery circuit, the method comprising the steps of:
   (a) driving a first voltage control oscillator (VCO) in the integral clock recovery circuit with a phase/frequency detector;
   (b) dividing down a signal from the first VCO to produce a divided down clock signal;
   (c) testing if a frequency of a reference clock signal and a frequency of the divided down clock signal differs by no more than a predetermined threshold;
   (d) switching control of the first VCO from the phase/frequency detector to a data phase detector so as to synchronize to a phase and a frequency of the incoming continuous stream of data, when the test in step (c) produces a result of true;
   (e) testing if the incoming continuous stream of data has a number of transitions greater than or equal to a preset value for an n-bit interval; and
   (f) signaling to the UNI device that the integral clock recovery circuit is locked on to the clock of the incoming continuous stream of data in the event the phase and frequency are synchronized in step (c) and the number of transitions is greater than or equal to the preset value in step (e).

38. A method, in a user network interface (UNI) device interfacing between a synchronous optical network (SONET) and an asynchronous transfer mode (ATM) connection, of synthesizing a high speed transmit clock from a low frequency reference source, the UNI device having an integral clock synthesis phase lock loop circuit, the method comprising the steps of:
   (a) controlling a voltage control oscillator (VCO) with a charge pump;
   (b) generating a divided down output signal from the VCO with a divider circuit;
   (c) comparing the divided down output signal to a reference clock signal; and
   (f) driveing the charge pump with a dual phase/frequency detector so as to synchronize the divided down output signal with the reference clock signal.

* * * * *